J. E. HENDERSON.
COASTER BRAKE.
APPLICATION FILED NOV. 6, 1916.
1,253,821.
Patented Jan. 15, 1918.
2 SHEETS—SHEET 1.
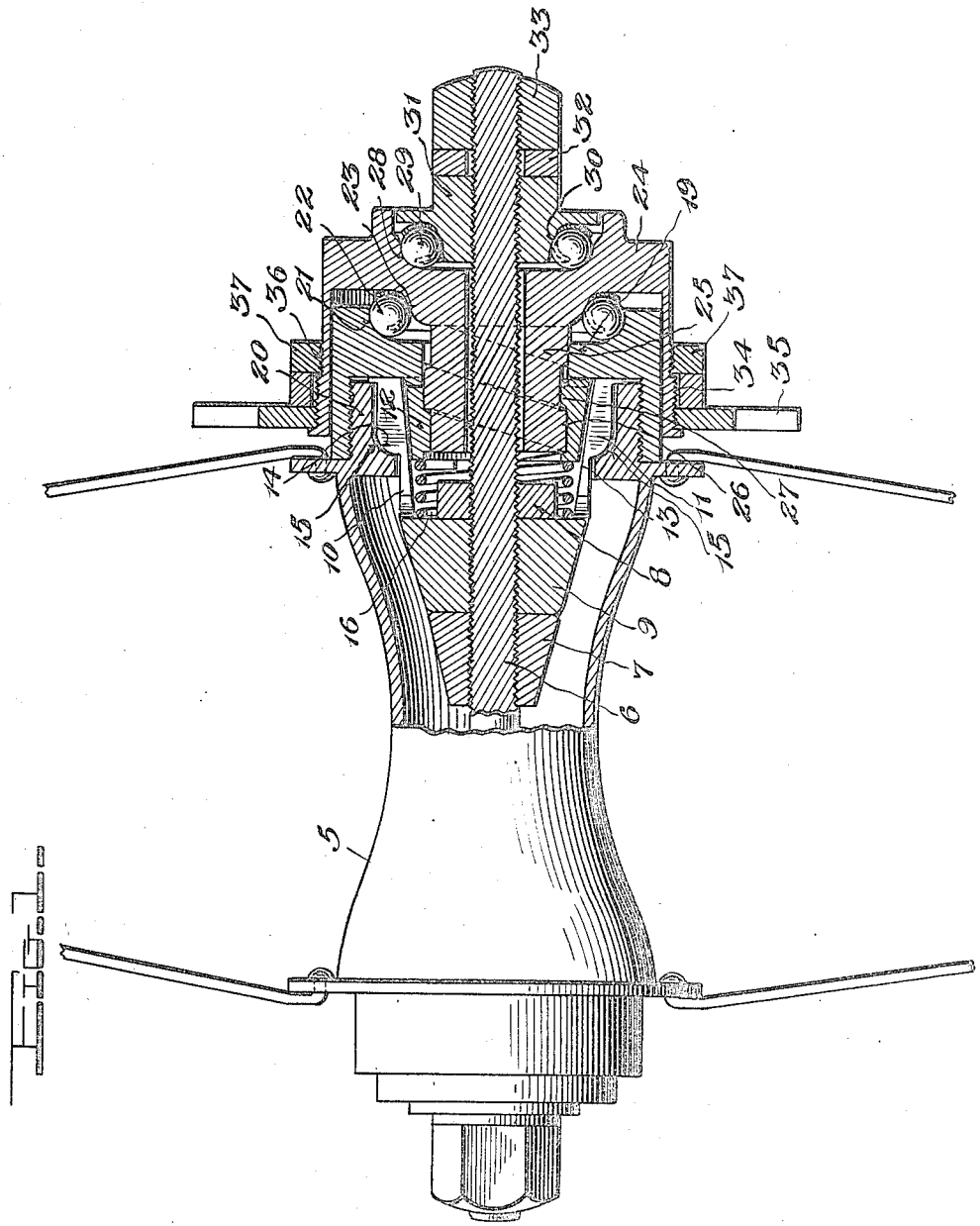
Witness
Chas. L. Griebauer.
Inventor
John E. Henderson,
By Knight Bros
Attorneys.

J. E. HENDERSON.
COASTER BRAKE.
APPLICATION FILED NOV. 6, 1916.
1,253,821.
Patented Jan. 15, 1918.
2 SHEETS—SHEET 2.
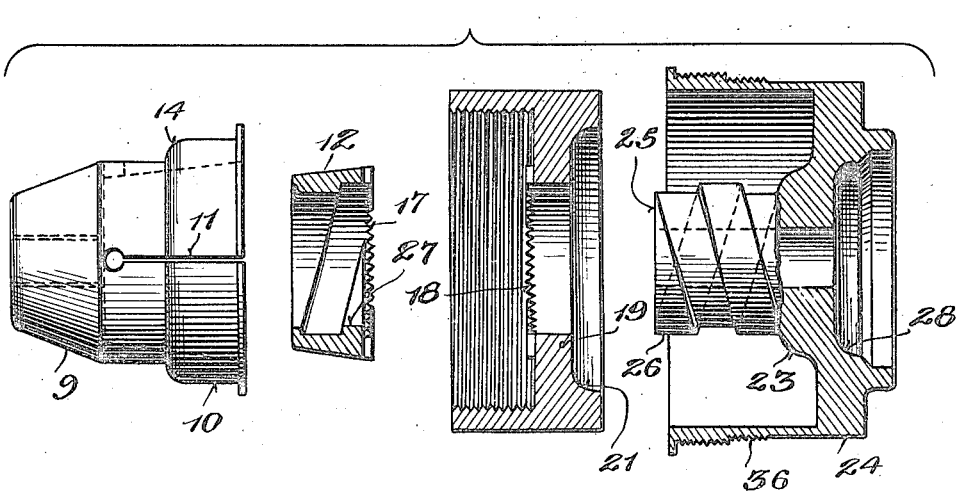
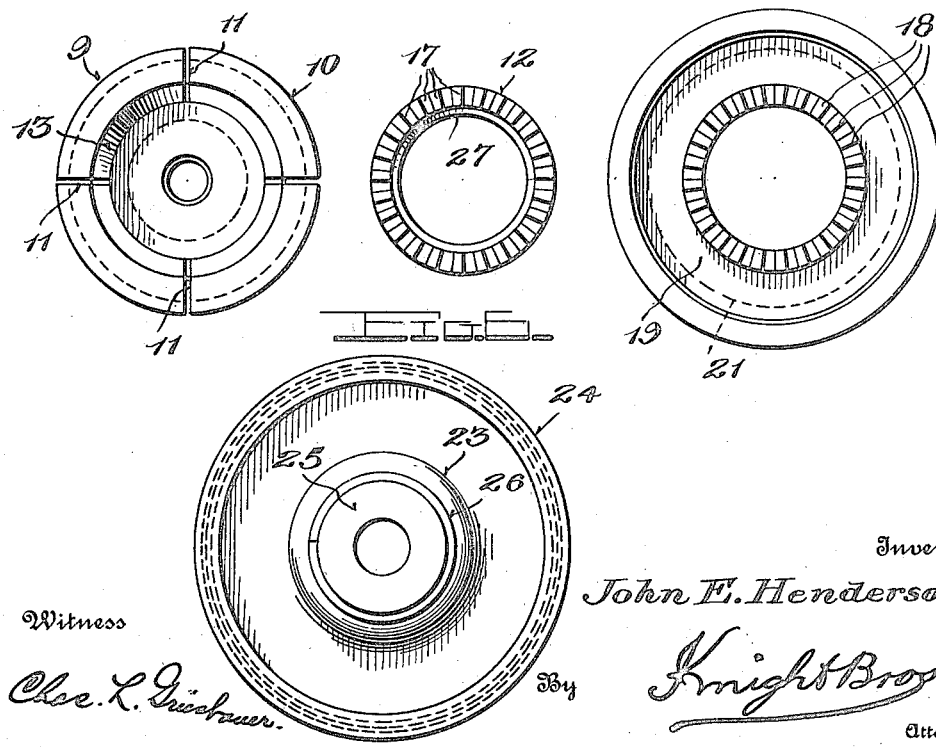
Witness
Chas. L. Guckauer.
Inventor
John E. Henderson,
By Knight Bros
Attorneys

UNITED STATES PATENT OFFICE.

JOHN E. HENDERSON, OF FORT MYERS, FLORIDA, ASSIGNOR OF ONE-THIRD TO C. E. KOESTER, OF FORT MYERS, FLORIDA.

COASTER-BRAKE.

1,253,821.  Specification of Letters Patent.  Patented Jan. 15, 1918.

Application filed November 6, 1916. Serial No. 129,775.

*To all whom it may concern:*

Be it known that I, JOHN E. HENDERSON, a citizen of the United States of America, residing at Fort Myers, in the county of Lee and State of Florida, have invented certain new and useful Improvements in Coaster-Brakes, of which the following is a specification.

This invention relates to coaster brakes and its object is to provide an improved structure of this type and one constructed in such manner as to adapt it to be quickly and easily attached to an ordinary bicycle hub without any change in the latter, it being merely necessary to unscrew the usual rear sprocket wheel from the bicycle hub and screw my improved coaster brake thereon in its stead. A further object of the invention is to provide an improved coaster brake composed of relatively few parts and operating in a simple and efficient manner to accomplish the usual purposes of devices of this nature.

Further objects and advantages of the invention will be set forth in the detailed description which now follows:

In the accompanying drawing:—

Figure 1 is a view partly in elevation and partly in section illustrating an ordinary bicycle hub having my improved coaster brake attached thereto.

Fig. 2 illustrates in side elevation and vertical section the members comprising the coaster brake assembly.

Fig. 3 is an end elevation of a split brake drum hereinafter described and illustrated in side elevation in Fig. 2.

Fig. 4 is an end elevation of a clutch cone hereinafter described and illustrated in vertical section in Fig. 2.

Fig. 5 is a face view of a hub extension hereinafter described and illustrated in vertical section in Fig. 2; and Fig. 6 is an inside face view of a sprocket drum hereinafter described and illustrated partly in vertical section and partly in elevation in Fig. 2.

Like numerals designate corresponding parts in all of the figures of the drawing.

In the drawing, 5 designates a bicycle hub of a conventional type and in applying my improved coaster brake thereto I employ an axle 6 somewhat longer than the axle usually employed. Nuts 7 and 8 threaded upon this axle clamp between them the body 9 of a brake drum 10. This brake drum is split at intervals as indicated at 11 to thereby render it capable of being expanded when a clutch cone 12 that is disposed therein is moved toward the left in Fig. 1, it being apparent from an inspection of said Fig. 1 that the inner walls 13 of the brake drum converge toward the left and co-act with the tapered outer face of the clutch cone 12. A rounded shoulder 14 formed upon the brake drum 10 is curved to conform to the usual bearing face 15 of the hub 5 and which bearing face ordinarily engages anti-friction ball bearings which are held in place by a cone screwed upon axle 6. However, in applying my coaster brake I remove these ball bearings and the aforesaid cone, and thereafter the surface 15 serves as the surface against which the brake drum is expanded under the action of the cone 12 when said cone is shifted toward the left in Fig. 1.

A spring 16 bears between the body 9 of the brake drum and the clutch cone 12 and normally tends to bring the teeth 17 formed upon said clutch cone into engagement with teeth 18 formed upon a hub extension 19, it being understood that in applying my improved coaster brake to the hub of an ordinary bicycle the usual sprocket, not shown, is unscrewed from the threaded extension 20 of hub 5 and the hub extension 19 is screwed into its place. The spring 16 is primarily intended to aid in releasing the clutch cone after said clutch cone has acted to expand the brake drum to apply the brake, as hereinafter described. The hub extension 19 is provided upon its outer face with a bearing recess 21 in which ball bearings 22 have a seating, said ball bearings acting between the bearing surface provided in recess 21 and a bearing cone 23 formed upon a sprocket drum 24. This sprocket drum carries a centrally disposed and inwardly projecting sleeve 25, said sleeve being provided with an external helix 26 which engages correspondingly shaped portions 27 formed internally upon clutch cone 12. These parts act as screw threads, as hereinafter described. The outer face of the sprocket drum 24 is recessed to provide bearing surfaces 28 and ball bearings 29 bear between said surfaces and corresponding bearing surfaces 30 upon a cone 31. A part of the frame of the bicycle is indicated at 32, said frame being clamped in the usual way between a nut 33 and the outer face of the cone 31. The sprocket drum 24 is externally threaded at 34 to receive a sprocket wheel 35 and the sprocket drum is further externally threaded at 36 to receive a lock nut 37 by which sprocket wheel 35 is held against displacement from sprocket drum 24.

When the rider pedals ahead the screw formed by the helix 26 causes the clutch cone 12 to move toward the right in Fig. 1, whereby the teeth 17 of said cone are caused to engage with the teeth 18 of hub extension 19 and consequently rotation will be imparted to said hub extension and to the hub 5. If the rider back pedals slightly the initial reverse movement of the screw will move the clutch cone 12 to disengage teeth 17 from the teeth 18 and consequently the hub 5 and hub extension 19 will be free to rotate with relation to the sprocket wheel 35 and sprocket drum 24. If the rider backpedals farther the screw constituted by helix 26 will move the clutch cone still farther toward the left in Fig. 1 and thereby expand the brake drum and force the shoulder 14 thereof into engagement with the shoulder 15 of the hub 5 so that a braking effect will be exerted upon hub 5.

From the foregoing description it will be noted that my construction, while efficiently serving the purpose of providing a device which will permit the driving of a wheel by a sprocket carrying member, will permit free rotation of said wheel with relation to said sprocket carrying member or will exert a braking effect upon said wheel, is, at the same time very simply and economically constructed and that it may be readily applied to bicycle hubs of the usual and well-known type. By virtue of these facts the bicycle dealer and repair man is not required to carry a large stock of bicycles or assembled wheels and coaster brakes but, upon the contrary, it is only necessary that he be equipped with the parts of coaster brakes of this type to enable him to equip any bicycle with a coaster brake in a very few minutes.

It is to be understood that the invention is not limited to the precise construction set forth but that, upon the contrary, it includes within its purview such changes as come either within the spirit or the terms of the appended claims.

Having described my invention, what I claim is:

1. The combination with a bicycle hub, of a hub extension adapted to be screwed thereon in place of the usual rear sprocket wheel, a sprocket drum, and a brake drum, and means for clutching said sprocket drum to said hub extension, upon rotating the sprocket drum in one direction and pressing said brake drum against said bicycle hub when rotating in the opposite direction.

2. The combination with a bicycle hub having a bearing face, of a hub extension adapted to be screwed thereon in place of the usual rear sprocket wheel, a sprocket drum, a brake drum, and means for clutching said sprocket drum to said hub extension, upon rotating the sprocket drum in one direction and pressing said brake drum against said bearing face when rotating in the opposite direction.

3. The combination with a bicycle hub, of a hub extension adapted to be screwed thereon in place of the usual sprocket wheel, a sprocket drum, a brake drum, a sprocket carried by said drum, a shiftable clutch cone, interengaging elements between said clutch cone and the sprocket drum for shifting said clutch cone into engagement with said brake drum when said sprocket drum is rotated in one direction and clutching elements between said clutch cone and the hub extension which engage when said clutch cone is shifted in the other direction.

4. The combination with a bicycle hub, of a hub extension adapted to be screwed thereon in place of the usual sprocket wheel, a sprocket drum, a sprocket carried by said drum, a clutch cone, inter-engaging elements between said clutch cone and the sprocket drum for shifting said clutch cone when said sprocket drum is rotated and clutching elements between said clutch cone and the hub extension which engage when said clutch cone is shifted in one direction, and a brake drum disposed in position to be expanded by said clutch cone when the clutch cone is shifted in the opposite direction.

5. The combination with a bicycle hub, of a hub extension adapted to be screwed thereon in place of the usual sprocket wheel, a sprocket drum, anti-friction bearings between the hub extension and the sprocket drum, an axle, anti-friction bearings between said axle and the sprocket drum, a brake drum fixed upon said axle and acting when expanded against that portion of the bicycle hub which formerly constituted one of its bearings, a clutch member, inter-engaging members between said clutch member and the sprocket drum through which said clutch member is shifted, clutch elements between said clutch member and the hub extension operative when the clutch member is moved in one direction, said clutch member acting when moved in the opposite direction to expand said brake drum.

In testimony whereof the foregoing specification is signed at Fort Myers, Florida, this 30 day of October, 1916.

JOHN E. HENDERSON.